United States Patent [19]

Coffey et al.

[11] Patent Number: 4,954,699

[45] Date of Patent: Sep. 4, 1990

[54] SELF-ADMINISTERED SURVEY QUESTIONNAIRE AND METHOD

[75] Inventors: Steve Coffey; William Weber, both of Glen Cove, N.Y.

[73] Assignee: NPD Research, Inc., Port Washington, N.Y.

[21] Appl. No.: 181,403

[22] Filed: Apr. 13, 1988

[51] Int. Cl.$^5$ .............................................. G06K 7/10
[52] U.S. Cl. .................................... 235/462; 235/375; 235/472; 358/84
[58] Field of Search ....................... 235/375, 462, 472; 358/84; 364/900

[56] References Cited

U.S. PATENT DOCUMENTS

| | | | |
|---|---|---|---|
| 4,355,372 | 10/1982 | Johnson et al. | 364/900 |
| 4,603,232 | 7/1986 | Kurland et al. | 358/84 |
| 4,658,290 | 4/1987 | McKenna et al. | 358/84 |

Primary Examiner—David L. Trafton
Attorney, Agent, or Firm—Bryan, Cave, McPheeters & McRoberts

[57] ABSTRACT

In a method for providing a self-administered survey using a bar coded survey questionnaire having a plurality of survey questions and a plurality of selectable responses to the questions, with the selectable bar coded responses (10) being scannable for storing the selected responses (10); the improvement comprising providing a bar code scannable skip pattern prompt (12a, 12b) embedded in a scannable bar code pattern (10) also containing the selectable response (14a, 14b), the skip pattern prompt (12a, 12b) being dependent on the selected response (14a, 14b); selecting a response to a particular survey question by scanning (22) the bar code pattern (10) associated with the selected response (14a, 14b); storing the selected response (14a, 14b) based on the scanned bar code pattern (10) and displaying (24) a prompt message, indicating a next question to be answered in the survey questionnaire based on the same scanned bar code pattern (10), whereby a single scanning of the selected bar code pattern (10) provides both the response selected (14a, 14b) and the skip pattern (12a, 12b) to the next question to be answered for providing branching directly from the scanned response (10).

15 Claims, 4 Drawing Sheets

QUESTION: QQ

ANSWER (a)

|||  ||  ||||| ← 10

QQ - A1 - NN2 - C
16  14a  12a  18

ANSWER (b)

|||  |||  ||||| ← 10

QQ - A2 - NN7 - C
16  14b  12b  18

1. DO YOU USE AN AUTOMATIC WASHING MACHINE TO DO YOUR LAUNDRY?

YES —10a
01102

NO ---▶(SKIP TO Q.6) —10b
01206

2. DO YOU USE BLEACH IN YOUR WASH?

YES
02103

NO ---▶(SKIP TO Q.4)
02204

3. WOULD YOU SAY YOU USE BLEACH IN YOUR WASH...

ALWAYS
03104

SOMETIMES
03204

RARELY
03304

4. DO YOU USE A FABRIC SOFTENER?

YES
04105

NO ---▶(SKIP TO Q.6)
04206

5. DO YOU USUALLY PUT THE FABRIC SOFTENER IN YOUR...

WASHER
05106

DRYER
05206

6. DO YOU HAVE AN AUTOMATIC DISHWASHER IN YOUR HOUSE?

YES
06107

NO ---▶(SKIP TO Q.9)
06209

7. DO YOU USE A RINSE AID PRODUCT IN YOUR AUTOMATIC DISHWASHER?

YES
07108

NO --→ (SKIP TO Q.9)
07209

8. WHAT ONE BRAND OF RINSE AID PRODUCTS DO YOU USE MOST OFTEN?

JET DRY
08109

DISH DRY
08209

OTHER
08309

DON'T KNOW
08409

9. IS THE WATER IN YOUR HOME?

HARD
09100

SOFT
09200

DON'T KNOW
09300

SELF-ADMINISTERED SURVEY QUESTIONNAIRE AND METHOD

BACKGROUND OF THE INVENTION

1. Field of the Invention

The present invention relates to survey questionnaires and methods employing such questionnaires in which the survey may be self-administered.

2. Description of the Prior Art

Systems for collecting survey information are well known in the art. Two existing alternative approaches are the paper questionnaire survey form and the computer-based survey program. In the paper-based survey approach a pre-printed list of questions is prepared. Interviewers then administer these questionnaires to respondents (for example consumers) by means of personal or telephone interviews. During this question and answer process, the interviewer manually marks the paper questionnaire, e.g. with a pencil, to indicate the responses. The information thus recorded on the questionnaire is subsequently entered into computer data files for analysis by means of key entry, commonly called key-punching. Typically such information is comprised of yes/no answers, choices from lists of research interest, and so forth. Generally, the selection of questions asked as a survey is manually administered depends on answers previously given to the interviewer by the respondent. Thus the total questionnaire form can be envisioned as a local "tree" structure in which respondents are manually taken down one or more "branches" by the interviewer, who must be carefully trained, depending on their answers to each question. There could also be sideways jumps from one branch to another, to follow this analogy, and even retracing of some paths. This progression through questions contingent on responses to other questions is reflected in what are called "skip patterns," which normally relate uniquely to a given questionnaire and require great care by the interviewer to insure an efficient interview with as little respondent burden as possible.

Nevertheless, the interview process, taking into account the desired skip patterns, the manual marking of responses on the paper forms and the subsequent key entry steps are often error prone and time consuming resulting in an undesirable respondent burden which could significantly affect the accuracy of the responses provided.

In the computer-based interview system, which is an attempt to minimize respondent burden, a computer is specially programmed to reflect the complete questionnaire, including all possible skip patterns. In such an instance, the interviewer is guided by the computerized questions appearing, for example, on a CRT terminal screen and enters the respondent's answer, in each case, back into the computer via a keyboard. The computer, having been programmed to respond in accordance with a given skip pattern for any given answer, then provides the next question to be asked on the CRT screen. The computer-based approach can be used in a personal interview situation, or in a telephone survey. In the latter case, the system is called CATI for Computer Assisted Telephone Interviewing. The computer based systems provide data immediately because the interviewer, in effect, completes the data entry function. However, such prior art computer based systems still involve the manual data entry of responses and, thus, can be error prone and cumbersome. Additionally special computer programming must be completed for a survey before the actual interview process can begin. Such programming normally requires extensive effort by technical specialists, and since it must be re-done for each different kind of survey, the result is again time consuming and subject to errors. Moreover, such programs tend to be long and complex, resulting in a related requirement for larger and more expensive host hardware.

Despite the above difficulties, both paper questionnaires and computerized approaches, as discussed above, have become popular in the collection of research and survey data. For example, the use of a computerized survey approach is disclosed in commonly owned U.S. Pat. No. Re 31,951 and in U.S. Pat. No. 4,528,442 in which a prompting scenario in software resident in the hand-held computer is used for the survey as is the specific survey program for the survey being conducted. Thus, as discussed above, the questions themselves must be resident in the computer and not in a paper questionnaire, and the computer must be reprogrammed for each different survey. Similarly, prior art CRT interviewing, although embodying logic checking routines, has the intelligence of the survey built into a specific resident computer program rather than into a paper questionnaire per se. In addition, although bar coded questionnaires are well known in the art, such as disclosed in U.S. Pat. Nos. 3,203,116 and 3,820,067, by way of example, as are other bar coded identification approaches, such as disclosed in U.S. Pat. Nos. 3,676,644; 4,588,211; 4,605,846; 4,017,834; 4,358,017; and 4,586,711, there are no prior art methods or systems known to applicants in which the intelligence of the survey is built into a paper questionnaire per se in which bar code responses contain both the answers to the question being asked as well as the skip pattern to the next question to be prompted based on the selected bar code response, so that a common generic survey program can be used with a plurality of different questionnaires. Applicants' approach herein overcomes these disadvantages of the prior art and enables data to be collected from each site using a variety of questionnaires, the nature of which are not known in advance, using a common program.

SUMMARY OF THE INVENTION

In a method for providing a self-administered survey using a bar coded survey questionnaire having a plurality of survey questions and a plurality of selectable responses to the questions, with the selectable bar responses being scannable for storing the selected responses; the improvement comprises providing a bar code scannable skip pattern prompt embedded in a scannable bar code pattern also containing the selectable response, the skip pattern prompt being dependent on the selected response; selecting a response to a particular survey question by scanning the bar code pattern associated with the selected response; storing the selected response based on the scanned bar code pattern, and displaying a prompt message indicating a next question to be answered in the survey questionnaire based on the same scanned bar code pattern, whereby a single scanning of the selected bar code pattern provides both the response selected and the skip pattern to the next question to be answered for providing branching directly from the scanned response.

BEST MODE FOR CARRYING OUT THE INVENTION

Figures 1, 4:
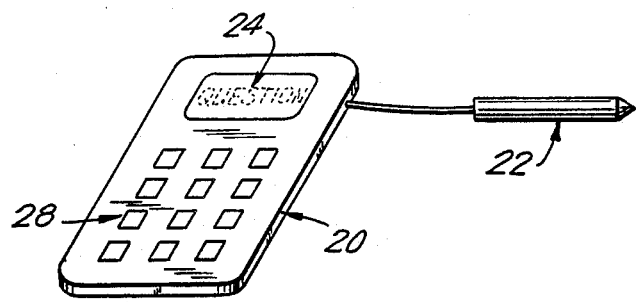
FIG. 1 is a diagrammatic illustration of a typical type of bar code response pattern in a bar code enhanced self-administered survey questionnaire in accordance with the present invention.
FIG. 4 is an illustrative diagram of a typical scanner for use with the present invention.

Referring now to the drawings in detail, and initially to FIG. 1 a typical type of bar code response pattern 10 in a bar code enhanced self-administered survey questionnaire in accordance with the present invention is shown. As shown by way of example in FIG. 1, the presently preferred bar code pattern 10 comprises several items of information embedded in the bar code pattern 10 including a built in skip pattern prompt 12a, 12b which contains prompt information indicating the next question (NN2, NN7) to be answered based on the survey question, as well as information (A1, A2) indicating the answer or choice 14a, 14b selected to the given survey question. In addition, preferably, the bar code response pattern also contains the question number (QQ) being answered 16 and a check digit (C) 18 to ensure the accuracy of the data.

Figure 2A:
FIG. 2A and 2B comprise an illustrative example of a typical bar code enhanced self-administered survey questionaire in accordance with the present invention employing the type of bar code response pattern in accordance with FIG. 1.
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2B:
Figure 2B:
Figure 2B:
Figure 2B:
Figure 2B:
Figure 2B:
Figure 2B:
Figure 2B:
Figure 2B:

Preferably, as shown in FIGS. 2A and 2B which taken together comprise an illustrative example of a typical bar code enhanced self-administered survey questionnaire in accordance with the present invention employing the aforementioned bar code type response pattern 10, human readable numbers are printed near the bar code pattern 10 which relates directly to the value contents of the bar code pattern 10 itself. Thus, by way of example FIGS. 2A and 2B comprise a nine question self-administered survey questionnaire in accordance with the present invention. Referring to Question 1 by way of example, the two bar code patterns 10a and 10b which are the two possible choices for answering this question are represented by the codes 01-1-02 and 01-2-06, respectively, written as 01102 and 01206 in FIG. 2A, respectively. In accordance with the present invention, and as will be explained in greater detail with reference to FIG. 3, the first response indicates that question 1 (01) has been selected, the first choice (1) to the question has been chosen, and the next question to be answered (02) which will appear as a prompt on the computer as will be described hereinafter, in question 2.

If, however, the second choice to question 1 had been selected, i.e. the "No" answer, then this bar code pattern 10b would provide the following information: question 1 (01), choice 2 (2) and a skip pattern prompt to question 6 (06). Similarly, in the above example of FIGS. 2A and 2B, skip pattern prompts are provided in the second choice to question 2, 4, 6, and 7. In the above example the check digit has not been indicated.

Of course, it should be understood that any type of bar code format may be employed in accordance with the present invention other than illustrated in FIGS. 2A and 2B by way of example. Thus, there are a number of bar code formats, called symbologies, in generally accepted use, including, for example UPC, Code 39, 2 of 5, and so forth. Preferably Code 39 may be used in the practice of the present invention because it can efficiently record both numbers (numeric) and letter (alpha). Specifications of Code 39, for example, can be found in numerous reference books or articles with which a practitioner would be familiar, such as for example, in the 3rd edition of *Reading Between the Lines, An Introduction to Bar Code Technology* published by Helmers Publishing, Inc.

The bar code pattern 10 can be printed on the self administered survey questionnaire, for example, by use of a Hewlett-Packard Laser Printer, such as model HP2680A, HP2687A or HP2686A. The laser printer, or other printer, prints the text of the survey questions, all the numbers, and the bar codes such as shown by way of example in FIGS. 2A and 2B. Applications software such as "Print Bar II" available from Bear Rock Software Company or bar code character fonts such as Hewlett Packard part number 92186T can be used in conjunction with the printers mentioned, by way of example, and a conventional word processing PC or a minicomputer to actually produce a master copy of a self-administered survey questionnaire in accordance with the present invention. The master copy is then preferably photocopied to produce it in quantity.

As shown by way of example in FIGS. 2A and 2B, in practicing this invention a copy of the self-administered bar coded survey questionnaire is provided to the respondent in conventional fashion, such as through the mail or in person. While an interviewer could assist the respondent, it is normally not necessary. In accordance with the present invention, the respondent would preferably be supplied with or have already been supplied with a conventional hand-held bar code reader 20 such as, by way of example, the model PTC-620 "Portable Tel-Transaction Computer" manufactured by Telxon Corporation or the "Micro-Wand II" manufactured by Hand Held Products, Inc.

In accordance with the present invention, the respondent preferably reads the presently preferred self-administered survey questionnaire and scans the desired bar code response with the conventional hand-held scanner 22. This is preferably accomplished by moving the pointer of the scanner, in contact with the paper, across the desired bar code pattern 10. This movement has been found to be easily carried out by otherwise untrained respondents. As will be explained in greater detail hereinafter with reference to FIG. 3, the scanner 20 then reads the selected bar code pattern 10, and as a result, provides a prompt to the next question to be answered while storing information relating to the choice or response that has been selected.

Figure 3:
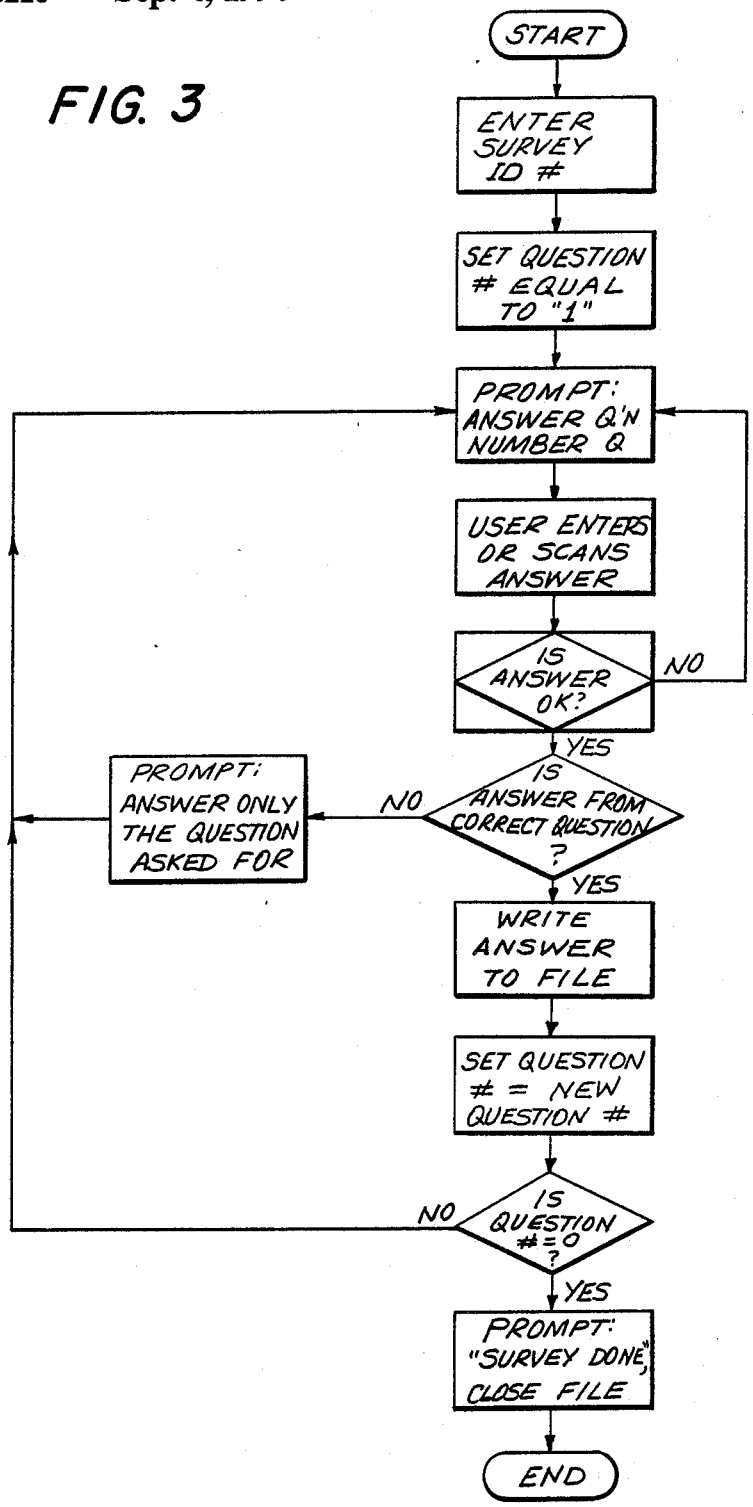
FIG. 3 is a diagrammatic illustration of a logic flow diagram representing the presently preferred survey program logic for use in accordance with the method of the present invention.

Referring now to the logic flow diagram of FIG. 3, upon such scanning motion, the conventional hand-held computer 20, under control of pre-programmed instructions, preferably stores in its memory, such as a conventional solid state memory, the actual question number 16 being answered (QQ) and the answer 14 (A), this being done based on the pattern 10 of coded bars just scanned. At the same time the Next Question to Answer 12 (NN), on the target question number, is preferably recorded temporarily, such as in a solid state register, in the conventional hand-held computer 20 and preferably displayed visibly on the conventional display 24 provided as part of the conventional hand-held computer 20. Observing this display 24, the respondent is thus prompted to answer another specific question; for example, "Question 6" in the example of choice 2 to Question 1 in FIG. 2A. Recalling that this next question was designated based on the NN field 12 in the former question's bar code 10, it can be seen that this amounts to a skip pattern being built into the questionnaire which, skip pattern is embedded in the bar code pattern 10 corresponding to the choice being selected.

In accordance with the presently preferred method, in response to the displayed skip pattern prompt, the respondent then reads the designated next question and scans the selected answer, such as one of the two choices to Question 6 in the above example, assuming the second choice to Question 1 was the previous selected answer. At this scan the hand-held computer 20, under program control, compares the question number (NN) to the desired target question number previously stored in the temporary register. If the question number being scanned is equal to the target question number temporarily stored, the scanned question number and answer is stored for subsequent transmission, and the new target question is written into the temporary register, replacing the number just previously there. If the target question number is not the same (does not agree) to the number stored in the temporary register, the hand-held computer 20 preferably indicates this condition, such as by emitting a warning beep sound, and re-displays the target question number.

The process just described comprises a cycle, indicated in the logic diagram of FIG. 3, in which the questions can preferably be answered only in the pre-specified sequence and preferably only specified answers can be offered, i.e. only answers from pre-ordained sets of possible alternatives. Once a cycle for a question is completed as just described, the respondent is then preferably successfully at the next proper designated question and the process continues as shown in FIG. 3.

In some cases, more than one correct response may exist for a given question, for example, in "mark all that apply" type of questions. By way of example, a respondent may be asked to identify from a list any and all places where product x is used in the home. In such an example, the respondent might mark all that apply as to kitchen, bathroom, bedroom, and/or garage. Each of these bar code responses would preferably have embedded therein a code making any of the same group of answers suitable. That is the target question number to be listed, in this case, is preferably the instant question number. Thus a loop is possible and the multiple answers are recorded in the hand-held computer's 20 memory on each pass around the loop. This loop is preferably only broken when the respondent scans the one answer marked "No More Choices," this one answer preferably sending the respondent to the next pre-designated target question. Thus such multiple response questions, called multi-punch data in language familiar to survey researchers, can be collected, recorded and subsequently transmitted to a host computer.

In some cases, it may be impossible or impractical for a respondent to successfully scan the bar code patter 10, such as, by way of example, in the unlikely event of a blemish on the paper form rendering a bar code unscannable. In these cases, the respondent would preferably be instructed to enter the visible human readable series of numbers. These numbers comprise QQ (16), A (14), NN (12) and C (18) as shown in FIGS. 1, 2A and 2B, by way of example. The check digit 18, C, is a one digit number preferably resulting from a certain mathematical manipulation of the previous five digits (QQANN). The mathematical manipulation which results in the single digit check digit 18 is called an algorithm. After an entry is manually keyed in via the keyboard 28, the respondent preferably hits the "ENTER" key. At that point, the hand-held computer 20 under program control, preferably makes its own computation of the check digit 18, using the programmed algorithm and based on the first five digits entered. It then preferably compares its calculated resulting check digit 18 with the sixth digit, the check digit 18 which was entered. Should they match, the hand-held computer 20 preferably stores the respondent data in its solid state memory for subsequent transmission. Should they not match, the hand-held computer 20 preferably provides an error signal to the respondent, such as the emission of a beep, and provides the instruction "RE-ENTER" on the visible display 24. When a correct sequence of digits, including the check digit 18, is successfully entered, the hand-held computer 20 preferably cycles to the next question as described in the general case above.

Because the variable nature of different questionnaires is implicit in the bar coded numbers printed in association with each question, as shown by way of example in FIGS. 2A, 2B, the same control proqram is preferably used for all the hand-held computers 20. Thus, in accordance with the present invention, only one computer program is ever needed in the hand-held device 20. This obviates the time consuming need to upload and store in computer memory the various programs which would be associated with each separate questionnaire in other approaches. This results in at least two key advantages over any approach in the prior art known to applicants; namely such control programs tend to be relatively short and can be stored in the 8000 byte program space typically available in less expensive hand-held units; and the survey design, including skip patterns, is easily developed by persons with ordinary word processing skills, thus obviating the need, as in other systems, for expensive and time consuming custom programming which can be done only by technical programmer specialists. A further advantage of the present invention is that the bar code pattern approach leaves ample room on questionnaire forms and is consistent with the inclusion of descriptive graphics. In addition, because the prompt to the respondent preferably consists normally of simply the next question number to be answered, a small visible display 24 is sufficient resulting in lower low cost and simpler hardware.

Because bar codes are not readable, in the ordinary sense, by human beings, the skip codes and indeed certain aspects of the answers may be made less obvious to the respondent. This helps overcome possible biasing of respondents which can occur in surveys where all the skip patters are spelled out in human readable form.

The self-administered questionnaire approach of the present invention also lends itself to easy termination of the interview or survey. For example, when the last question has been answered, the last question at the end of the last logical branch of the skip pattern logic tree as noted formerly, the survey is complete. This conclusion is preferably accomplished in the present invention by embedding in these "last question" positions, as shown in FIG. 3, in lieu of a target question code, at NN, instead a command which is preferably interpreted by the hand-held computer 20 as a terminating command. At that point, the respondent is preferably advised of the completion by a message in the display area 24 of the hand-held computer 20.

Thus, by utilizing the self-administered questionnaire and method of the present invention, a plurality of different surveys may be administered using a common survey program with the individual survey questionnaires having skip patterns embedded in the bar code pattern responses to the individual survey questions.

What is claimed is:

1. In a survey questionnaire comprising a plurality of survey questions, and a plurality of selectable responses associated with each of said survey questions; the improvement comprising a bar code scannable pattern associated with each response, said bar code scannable pattern comprising a selectable response to a particular survey question and a skip pattern prompt indication embedded therein comprising prompting information corresponding to a next question to be answered in said plurality of survey questions in said survey questionnaire based on selection of said selectable response, said bar code scannable pattern being adapted for scanning by a bar code scanning device having a storage means and a display associated therewith for storing the scanned selectable response and displaying said prompting information, whereby a self-administered survey questionnaire may be provided.

2. An improved survey questionnaire in accordance with claim 1 wherein said bar code scannable pattern further comprises an indication of the survey question being responded to.

3. An improved survey questionnaire in accordance with claim 2 wherein said bar code scannable pattern further comprises a check digit.

4. An improved survey questionnaire in accordance with claim 1 wherein only a portion of said selectable responses contain a skip pattern prompt indication indicating a next question to be approved different from the next successive question in said survey questionnaire.

5. In a method for providing a self-administered survey using a bar coded survey questionnaire having a plurality of survey questions and a plurality of selectable responses to said questions, with said selectable bar responses being scannable for storing said selected responses; the improvement comprising providing a bar code scannable skip pattern prompt embedded in a scannable bar code pattern also containing said selectable response, said skip pattern prompt being dependent on the selected response; selecting a response to a particular survey question by scanning said bar code pattern associated with said selected response; storing said selected response based on said scanned bar code pattern and displaying a prompt message, indicating a next question to be answered in said survey questionnaire based on the same scanned bar code pattern, whereby a single scanning of said selected bar code pattern provides both the response selected and the skip pattern to the next question to be answered for providing branching directly from said scanned response.

6. An improved method in accordance with claim 5 wherein said selecting step further comprises scanning said bar code pattern for providing an indication of the question being responded to.

7. An improved method in accordance with claim 6 wherein said storing step further comprises storing a target question number corresponding to said next question to be answered; said method further comprising comparing said target question number contained in a previous selected response with said indication of the next question being answered.

8. An improved method in accordance with claim 7 further comprising the step of storing the selected response only when said stored target question number corresponds to said indication of the next question being answered.

9. An improved method in accordance with claim 8 further comprising the step of redisplaying said prompt message when said stored target question number fails to correspond to said indication of the next question being answered.

10. An improved method in accordance with claim 9 wherein at least one of said selectable responses further comprises a last question indication embedded in said selectable bar code pattern associated therewith, said displaying step further comprising displaying a survey terminating message in response to said scanning of said bar code pattern selectable response containing said last question indication.

11. An improved method in accordance with claim 5 wherein at least one of said selectable responses further comprises a last question indication embedded in said selectable bar code pattern associated therewith, said displaying step further comprising displaying a survey terminating message in response to said scanning of said bar code pattern selectable response containing said last question indication.

12. An improved method in accordance with claim 7 wherein said storing step further comprises the step of storing the selected response only when said stored target question number corresponds to said indication of the next question being answered.

13. An improved method in accordance with claim 7 further comprising the step of redisplaying said prompt message when said stored target question number fails to correspond to said indication of the next question being answered.

14. An improved method in accordance with claim 13 wherein at least one of said selectable responses further comprises a last question indication embedded in said selectable bar code pattern associated therewith, said displaying step further comprising displaying a survey terminating message in response to said scanning of said bar code pattern selectable response containing said last question indication.

15. An improved method in accordance with claim 5 further comprising administering a plurality of different surveys each employing a different one of said bar coded survey questionnaires, each of said different survey questionnaires scannable bar code patterns being scannable using a common survey program.

* * * * *

UNITED STATES PATENT AND TRADEMARK OFFICE
CERTIFICATE OF CORRECTION

PATENT NO. : 4,954,699

DATED : September 4, 1990

INVENTOR(S) : STEVE COFFEY and WILLIAM WEBER

It is certified that error appears in the above-identified patent and that said Letters Patent is hereby corrected as shown below:

Column 3, line 9: Change "questionaire" to --questionnaire--.

Column 3, line 21: Between "FIG. 1" and "a" insert a comma (,).

Column 4, line 11: Change "Readinq" to --Reading--.

Column 4, line 16: Between "Laser" and "Printer" insert "Jet".

Column 5, line 63: Change "patter" to --pattern--.

Column 6, line 28: Change "proqram" to --program--.

Column 6, line 52: Change "lower low cost" to --lower cost--.

Column 6, line 58: Change "patters" to --patterns--.

Signed and Sealed this

Eighth Day of December, 1992

*Attest:*

DOUGLAS B. COMER

*Attesting Officer*    *Acting Commissioner of Patents and Trademarks*